United States Patent [19]

Schwarz

[11] 4,336,298

[45] Jun. 22, 1982

[54] ADHESIVE COMPOSITION AND COMPOSITE MADE THEREWITH

[75] Inventor: David S. Schwarz, Monroe Falls, Ohio

[73] Assignee: The B. F. Goodrich Company, Akron, Ohio

[21] Appl. No.: 273,133

[22] Filed: Jun. 12, 1981

[51] Int. Cl.³ .............................................. B32B 15/00
[52] U.S. Cl. .................................... 428/285; 428/287; 428/425.6; 428/430; 428/480; 524/874
[58] Field of Search ................ 260/37 N; 528/58, 77, 528/81; 428/246, 251, 285, 286, 287, 480, 425.6, 430

[56] References Cited

U.S. PATENT DOCUMENTS 3,248,371  4/1966  Damusis ................................ 528/77
3,812,003  5/1974  Larson et al. ........................ 428/480
4,296,212  10/1981 Ewen et al. ............................ 528/77

Primary Examiner—James J. Bell
Attorney, Agent, or Firm—James R. Lindsay

[57] ABSTRACT

An adhesive system that can be used for bonding together fiberglass reinforced polyester (FRP) panels is provided. The adhesive system is comprised of a "hardener component" containing a polyester or polyether triol, paraphenylene diamine or ortho-phenylene diamine, and desirably a tin compound catalyst, and a "base component" containing an aromatic diisocyanate. The two components are mixed together just prior to bonding and the mixture is spread on the FRP panel surfaces desired to be bonded together. The panels are assembled and held clamped together until the adhesive sets.

8 Claims, No Drawings

ADHESIVE COMPOSITION AND COMPOSITE MADE THEREWITH

BACKGROUND OF THE INVENTION

In an endeavor to lessen the weight of passenger cars and to reduce car body rusting, it has been proposed to expand the use of fiberglass reinforced polyester (FRP) panels to replace some or all of the metal body panels currently being used in car bodies. In the use of the FRP panels, the panels which form the completed body customarily are joined together with an adhesive bonding system.

To be satisfactory, the adhesive system must produce a strong bond (35 kgf/cm$^2$ minimum) within a relatively short period of time (desirably within about 7-8 minutes) at ambient production area temperatures (which normally range from about 20° C. to 35° C.) and withstand the relatively high temperatures developed within the engine compartment of modern cars.

The adhesive also must have sufficient resistance to flow during the time which elapses after application to the FRP panels and before it sets to resist flowing outside the prescribed "bond line" between the assembled panels even if the assembled panels are upended for movement to the next assembly point before the adhesive has had an opportunity to set.

One adhesive material which has been proposed for bonding FRP panels is based upon a polyurethane composition obtained by reacting together 100 parts of a polyester or polyether polyol or a polyesteramide with a molecular weight between 700 and 4500, 38 to 80 parts of an organic polyisocyanate, 5 to 200 parts of filler, a catalyst, and sufficient monomeric nitrogen containing polyol having from 3 to 6 hydroxyls to react with the excess polyisocyanate material in the system (see U.S. Pat. No. 3,812,003).

SUMMARY OF THE INVENTION

The present invention provides an adhesive process for bonding together FRP panels which utilizes a polyurethane adhesive composition that has excellent resistance to flow between the time that it is applied to the panels and the time the adhesive sets. The excellent flow resistant properties of the adhesive composition prevents objectionable flow of the adhesive beyond the desired "bond line" between the assembled panels while the adhesive is in a fluid condition. In accordance with the present invention, para-phenylene diamine or ortho-phenylene diamine is included in the adhesive composition for bonding the FRP panels together, along with a polyester or polyether triol, to produce the desired resistance to flow. In addition to the para-phenylene diamine or ortho-phenylene diamine and the polyester or polyether triol, the adhesive composition includes an aromatic diisocyanate and a tin compound catalyst to accelerate the reaction between the triol and the isocyanate.

DETAILED DESCRIPTION OF THE INVENTION

The adhesive system of the present invention utilizes a "two-part" adhesive (a "base component" and a "hardener component"), the parts of which are mixed together just prior to being used for bonding the FRP panels together. The "hardener component" contains the polyester or polyether triol, the para-phenylene diamine or orthophenylene diamine and, desirably, the tin compound catalyst, while the "base component" includes the aromatic diisocyanate. The "base component" desirably is formulated to provide a composition that has a viscosity of from 20,000 to 55,000 centipoise per second (cps) at 25° C., while the "hardener component" desirably is formulated to provide a composition that has a viscosity of from 800 to 4,000 cps at 25° C.

The polyester triols or polyether triols used in the "hardener component" are those having a molecular weight between about 400 and 1,000. The polyester triols generally are condensation products of a polycarboxylic acid or its anhydride (such as adipic acid or phthalic anhydride) with a triol (such as trimethylolpropane, 1,2,6-hexanetriol or 1,1,1-trimethylolethane). The polyether triols include the poly (oxyalkylene) derivatives of polyhydric alcohols, exemplified by glycerol, 1,1,1-trimethylolpropane and 1,2,6-hexanetriol and the poly(oxypropylene) adducts of glycerol, 1,1,1-trimethylolpropane and 1,2,6-hexanetriol.

The para-phenylene diamine or ortho-phenylene diamine or mixtures thereof are included in the adhesive system to produce the desired excellent resistance to flow in the adhesive during the period after the two components of the system are mixed together and before setting of the adhesive occurs. Although the amount of para-phenylene diamine or ortho-phenylene diamine or mixtures thereof added to the adhesive system in order to produce the desired flow resistance can vary, usually from 1.8 to 3.0 parts by weight of the diamine(s) per 100 parts by weight of the polyester or polyether triol are used in the adhesive system.

The tin compound catalyst desirably is included in the "hardener component" of the adhesive system and is present in an amount to cause the adhesive to "gel" or "set" within an acceptable time period at the ambient temperature of the work area. Generally, it is desired that the adhesive used for bonding FRP panels "gel" or "set" within about 7-8 minutes at temperatures normally experienced in the production area which range normally between about 20° C. and 35° C., although a set time of up to about 15 minutes is acceptable. Usually from 0.01 to 0.2 parts by weight of the tin compound catalyst per 100 parts by weight of the polyester or polyether triol is adequate to impart an acceptable "gel" or "set" time to the adhesive system. Although dibutyl tin dilaurate is preferred for use in the adhesive system, other tin compound catalysts for urethane reactions can be used (for example, dialkyl tin dioctate, dibutyl tin maleate and dibutyl tin amyl mercaptide). Tin compound catalysts for urethane reactions may be represented by the formula SnX$_4$ where one or all of the X's may be the same or different and where X may be a hydrocarbon radical, a halogen, or an oxygenated or thionated hydrocarbon.

The aromatic diisocyanate component of the adhesive system is included in the "base component" of the system and, desirably, has a functionality of from about 2.3 to 2.7 and an equivalent weight of about 85 to 150. Representative aromatic diisocyanates are m-phenylene diisocyanate, p-phenylene diisocyanate, methylene di-p-phenylene diisocyanate, 2,4-tolylene diisocyanate, 2,6-tolylene diisocyanate, 3,3'-dimethyl-4,4'-biphenylene diisocyanate and 1,8-naphthylene diisocyanate. Ideally, the aromatic diisocyanate is present in a stoichiometric quantity to just react with all of the functionally active hydroxyl and amine groups in the adhesive system. However, to insure complete reaction of the functionally active hydroxyl and amine groups, a slight excess of the aromatic diisocyanate is used in the adhesive system. Preferably, an amount of the aromatic diisocyanate in excess of that amount required to stoichiometrically react with the polyester or polyether triol in the "hardener component" is used in the adhesive system, and an additional amount of a diol or tetrol free of nitrogen groups or combination thereof (for example, 1,4-butanediol or the reaction product of pentaerythritol and propylene oxide) is added to the adhesive system to react stoichiometrically with the excess isocyanate groups.

An inert powdery filler normally is added to the "base component" of the adhesive system and aids in controlling the viscosity of the "base component". The amount of such filler may vary, but desirably 20 to 100 parts by weight of filler is added to the "base component" for every 100 parts by weight of aromatic diisocyanate present in the adhesive. Representative filler materials are limestones, hydrous magnesium silicate (talc) and carbon black.

If desired, a colorant may be added to either the "hardener component" or the "base component" of the adhesive system or to both of the components.

The use of the monomeric nitrogen containing polyol with from 3 to 6 hydroxyls suggested as a component of the FRP adhesive system described in U.S. Pat. No. 3,812,003 is not used in the adhesive system of the present invention because of the presence of the para-phenylene diamine or ortho-phenylene diamine in the adhesive system herein described, since the combination would produce an adhesive material that has an objectionably short gel or set time once the adhesive components are mixed together.

In the use of the adhesive system of the present invention, the surfaces of the FRP panels to be bonded together first are "wiped" or sprayed with an FRP primer, such as a solvent solution of an organic polyisocyanate. The two components of the adhesive system (i.e., the "hardener component" and the "base component") are mixed together (desirably by feeding the two components to a portable hand-held mixing head) to form a reaction mixture comprised of (a) 100 parts by weight of a polyester triol or a polyether triol having a molecular weight between about 400 and 1000, (b) an aromatic diisocyanate having a functionality of from about 2.3 to 2.7 and an equivalent weight of about 85 to 150, said isocyanate being present in an amount in excess of the amount to stoichiometrically react with the polyester triol or polyether triol in the mixture, (c) sufficient para-phenylene diamine or orthophenylene diamine or a mixture thereof to produce a desired flow resistance in the reaction mixture, (d) sufficient tin compound catalyst to achieve setting of the reaction mixture within 15 minutes after the two components of the adhesive system are mixed together, and (e) sufficient amount of polyol free of nitrogen groups to provide functional hydroxyl groups to stoichiometrically react with at least essentially all of the excess reactive isocyanate groups in the reaction mixture. A thin film of the reaction mixture is spread on one or both of the surfaces of the FRP panels to be bonded together and the two panels are clamped together until the adhesive mixture sets. Setting of the adhesive mixture can be accelerated by heating the assembly (desirably, to a temperature between 100° C. to 175° C.).

Although the adhesive system has been described for bonding two FRP panels together, the system also can be used for FRP-to-metal bonding and for metal-to-metal bonding.

The invention will be more fully understood from the following examples.

EXAMPLE I

A two-part adhesive system comprised of a "hardener component" and a "base component" was formed according to the following formulations:

| Hardener Component | |
| --- | --- |
| Material | Parts by Weight |
| Polyether triol (Pluracol TP440*) | 100.0 |
| 1,4-Butanediol | 7.4 |
| Tetrol (Pluracol PEP450**) | 20.3 |
| Para-Phenylenediamine | 3.19 |
| Dibutyltin dilaurate | .07 |
| Total | 130.96 |

*Reaction product of trimethylolpropane and propylene oxide having a molecular weight of about 425, a viscosity of 600 cps at 25° C., and an apparent pH of 6.5, produced by BASF Wyandotte Corporation.
**Reaction product of pentaerythritol and propylene oxide with an equivalent weight of about 100, sold by Wyandotte Chemical Company.

The "hardener component" was formed by mixing the ingredients together in a reactor at 100° C. at a pressure of less than 100 millimeters (mm) of mercury for one and one-half hours.

| Base Component | |
| --- | --- |
| Material | Parts by Weight |
| Polyol (Pluracol 220*) | 100.0 |
| Polyether triol (Pluracol TP440**) | 9.4 |
| Limestone filler | 75.0 |
| Aromatic diisocyanate (PAPI 901***) | 107.0 |
| Total | 291.4 |

*Polyol having a molecular weight of about 2600, a viscosity of 1200 cps at 25° C., and an apparent pH of 6.5, manufactured by BASF Wyandotte Corporation.
**Reaction product of trimethylolpropane and propylene oxide having a molecular weight of about 425, a viscosity of 600 cps at 25° C., and an apparent pH of 6.5, produced by BASF Wyandotte Corporation.
***A polymethylene polyphenylene isocyanate having a functionality of 2.3, an isocyanate equivalent of 133, and a viscosity of 80 cps at 25° C., manufactured by Upjohn Polymer Chemicals.

The functional hydroxyl groups of the polyols in the "base component" react with aromatic diisocyanate which provides a composition having a desirable viscosity. The limestone filler improves of the compatibility of the polyol and diisocyanate components.

In the preparation of the "base component", the ingredients (with the exception of the diisocyanate) were mixed together and degassed in a reactor at 100° C. under a vacuum of less than 100 mm of mercury for three hours. The degassed mixture was cooled to 70° C. and the diisocyanate was added to the mixture, care being exercised to exclude moisture which would react with isocyanate in the mixture.

To test the bonding strength of the adhesive system, the two components of the adhesive were mixed together in a volume ratio of 3.36 to 1 of base component to hardener component. The adhesive immediately after being mixed was applied as a thin coat to opposed surfaces of two FRP panels (produced from Derakane 790 vinylester compound manufactured by Dow Chemical Company) along an edge bonding zone 2.54 centimeters in width, the bonding surfaces previously having been primed with a primer comprised of one part by weight of p,p',p''-triphenylmethane triisocyanate to five parts by weight of methylene chloride. The two FRP panels were clamped together with the bonding zones coated with adhesive in face-to-face contact. The adhesive set within about ten minutes forming a bonded lap seam 2.54 centimeters wide between the two FRP panels. The bond was aged at 25° C. for 24 hours, heated at 135° C. for 30 minutes, and tested at 25° C. for shear strength by the procedure described in ASTM Designation No. D1002-53T. The shear strength results listed in Table I are the average result of six test samples:

TABLE I

| Test Condition | Shear Strength in kgf/cm$^2$ |
| --- | --- |
| Initial | 63.91 |
| After 14 days @ 93° C. | 62.36 |
| After 24 hours immersed in boiling water | 64.27 |
| After 90 days @ 37° C. in 98% relative humidity | 65.61 |
| After 3 hours @ 138° C. | 61.58 |

EXAMPLE II

The adhesive system of Example I was used to prepare lap bonded specimens comprised of a FRP panel and a cold rolled steel panel. The prepared specimens were aged at 25° C. for 24 hours, heated for 30 minutes at 135° C. and tested at 25° C. for shear strength by the procedure described in ASTM Designation No. D1002-53T. The shear strength results listed in Table II are the average result of six test samples:

TABLE II

| Test Condition | Shear Strength in kgf/cm$^2$ |
| --- | --- |
| Initial | 74.37 |
| After 14 days @ 93° C. | 70.84 |
| After 24 hours immersed in boiling water | 83.64 |
| After 98 days @ 37° C. in 98% relative humidity | 75.08 |
| After 3 hours @ 138° C. | 80.95 |

EXAMPLE III

A two-part adhesive system was formed using the "base component" described in Example I and a "hardener component" formed according to the following formulation:

| Hardener Component | |
| --- | --- |
| Material | Parts by Weight |
| Polyester triol (RUCO 2015-200*) | 100.0 |
| 1,4-Butanediol | 10.2 |
| Para-phenylene diamine | 3.01 |
| Trimethylol propane | 20.0 |
| Dibutyl tin dilaurate | .0605 |
| Red dye | .035 |
| Total | 133.055 |

*Polyester triol with a functionality of 2.8, a molecular weight of 785, and a viscosity of 8000 cps, manufactured by Hooker Chemical Corporation.

The adhesive was mixed as described in Example I and test samples for bonded lap strength tests were prepared as described in Example I.

The specimens were tested for shear strength within one day after bonding and at the specified temperatures by the procedure described in ASTM Designation No. D1002-53T. The shear strength results listed in Table III are the average result of five test samples:

TABLE III

| Test Temperature | Shear Strength in kgf/cm$^2$ |
| --- | --- |
| −40° C. | 50.20 |
| 25° C. | 46.03 |
| 82° C. | 35.92 |
| 121° C. | 20.93 |
| 200° C. | 7.21 |

EXAMPLE IV

Additional FRP lap-bonded samples were prepared using the adhesive system described in Example III with a 1.25 cm bonding zone and quick set at the temperatures and for the times listed in Table IV. Immediately after setting and while still warm they were impacted on their edge in an impact tester and the force to break the bond was recorded. The results listed in Table IV are the average result of two test samples.

TABLE IV

| Set Time | Set Temperature | Impact (kg/cm$^2$) |
| --- | --- | --- |
| 3 minutes | 110° C. | 21.9 |
| 5 minutes | 110° C. | 44.9 |
| 3 minutes | 116° C. | 23.0 |
| 5 minutes | 116° C. | 43.1 |
| 3 minutes | 121° C. | 28.2 |
| 5 minutes | 121° C. | 43.1 |

EXAMPLE V

Two-part adhesive systems were formed using the "base component" described in Example I and "hardener components" according to the following formulations:

| | Hardener Component | |
| --- | --- | --- |
| | Parts By Weight | |
| Material | Composition A | Composition B |
| Polyether triol (Pluracol TP440) | 100.0 | 100.0 |
| Tetrol (Pluracol PEP450) | 124.0 | 100.0 |
| Ortho-phenylene diamine | 5.56 | 12.5 |
| Dibutyl tin dilaurate | 0.049 | 0.049 |
| Total | 229.609 | 212.549 |

The adhesive was mixed as described in Example I and test samples for bonded lap strength tests were prepared as described in Example I. The samples were tested by the test procedure referenced in Example I. The test results are listed in Table V:

TABLE V

| Adhesive System | Initial Shear Strength in kgf/cm$^2$ |
| --- | --- |
| With Composition A as hardener component | 64.5 |
| With Composition B as hardener component | 66.5 |

I claim:
1. A two-part adhesive system which produce when intermixed a reaction mixture comprised of:
(a) 100 parts by weight of a polyester triol or polyether triol having a molecular weight of about 400 to 1000,

(b) an aromatic diisocyanate having a functionality of from about 2.3 to 2.7 and an equivalent weight of from about 85 to 150, said aromatic diisocyanate being present in an amount in excess of the amount necessary to stoichiometrically react with the polyester triol or polyether triol in said reaction mixture, (c) sufficient para-phenylene diamine or ortho-phenylene diamine or a mixture thereof to produce adequate resistance to flow in the reaction mixture, (d) sufficient tin compound catalyst to cause the reaction mixture to set within 15 minutes at the ambient temperature, and (e) sufficient additional polyol free of nitrogen groups to provide functional hydroxyl groups essentially equivalent to the isocyanate groups in excess of the necessary isocyanate groups to stoichiometrically react with said polyester triol or polyether triol.

2. The adhesive system of claim 1 wherein said adhesive system includes from 20 to 100 parts by weight of an inert powdery filler.

3. The adhesive system of claim 1 wherein one part of the said two-part system is a component comprised of:
(a) said 100 parts by weight polyester triol or polyether triol,
(b) said para-phenylene diamine or orthophenylene diamine or mixture thereof, and
(c) said tin compound catalyst, and which has a viscosity of from 800 to 4,000 cps at 25° C., and wherein said second part of the two-part system is a component comprised of said aromatic diisocyanate and which has a viscosity of from 20,000 to 55,000 cps at 25° C.

4. The adhesive system of claims 1 or 2 wherein said adhesive mixture contains from 1.8 to 3.0 parts by weight of para-phenylene diamine or ortho-phenylene diamine or mixture thereof per 100 parts by weight of said polyester triol or polyether triol in said adhesive mixture.

5. The adhesive system of claims 1 or 2 wherein the said diamine in the adhesive mixture is para-phenylene diamine.

6. The adhesive system of claims 1 or 2 wherein said adhesive mixture contains from 0.01 to 0.2 parts by weight of said tin compound catalyst per 100 parts by weight of said polyester triol or polyether triol in said adhesive mixture.

7. The adhesive system of claim 1 wherein said tin compound catalyst is dibutyl tin dilaurate.

8. A laminate comprised of two panels of fiberglass reinforced polyester adhered together with an adhesive comprising a reaction product of a reactive mixture of:
(a) 100 parts by weight of a polyester triol or polyether triol having a molecular weight of about 400 to 1000,
(b) an aromatic diisocyanate having a functionality of from about 2.3 to 2.7 and an equivalent weight of from about 85 to 150, said aromatic diisocyanate being present in an amount in excess of the amount necessary to stoichiometrically react with the polyester triol or polyether triol in said reaction mixture,
(c) sufficient para-phenylene diamine or ortho-phenylene diamine or a mixture thereof to produce adequate resistance to flow in said reactive mixture,
(d) sufficient tin compound catalyst to cause said reactive mixture to set within 15 minutes of the ambient temperature, and
(e) sufficient additional polyol free of nitrogen groups to provide functional hydroxyl groups essentially equivalent to the isocyanate groups in excess of the necessary isocyanate groups to stoichiometrically react with said polyester triol or polyether triol.

* * * * *